May 2, 1933.  D. J. ANGUS  1,907,096
RECORDING METER
Filed Oct. 13, 1928  3 Sheets-Sheet 1

Inventor
DONALD J. ANGUS
By Schley & Irish
Attorneys

May 2, 1933.  D. J. ANGUS  1,907,096
RECORDING METER
Filed Oct. 13, 1928   3 Sheets-Sheet 2
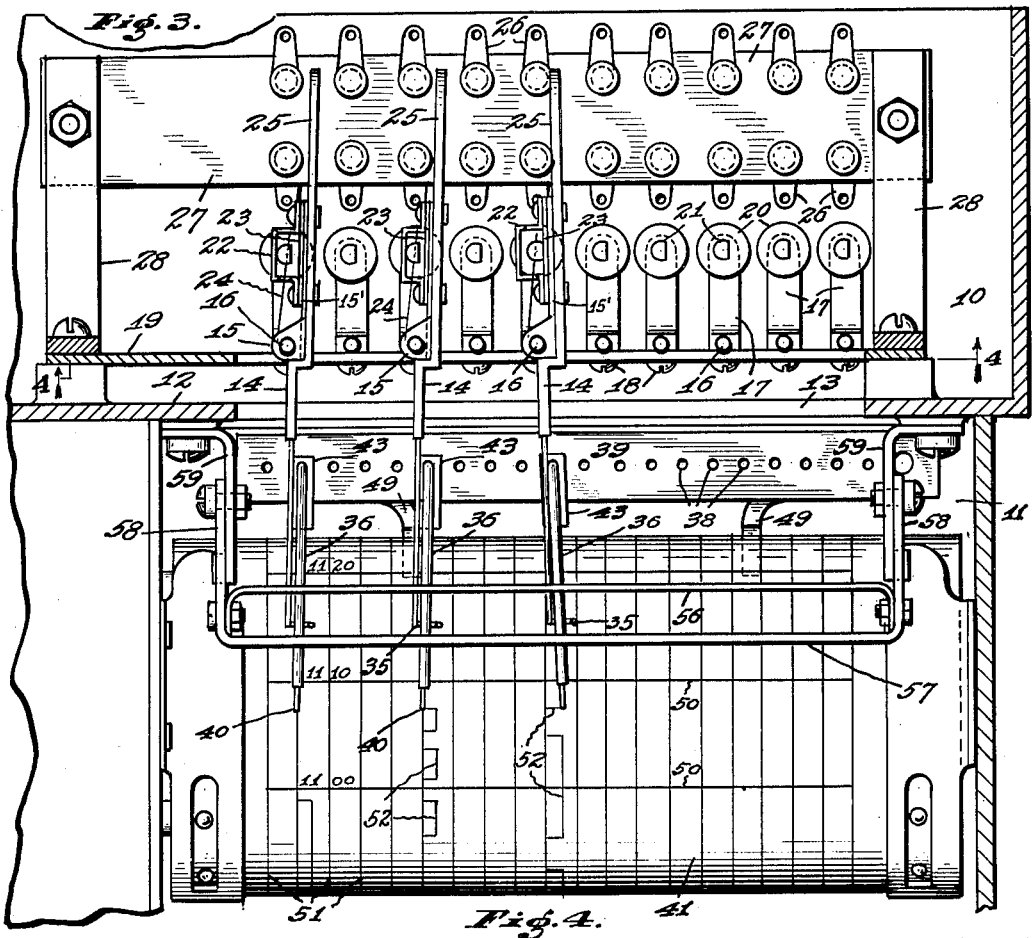
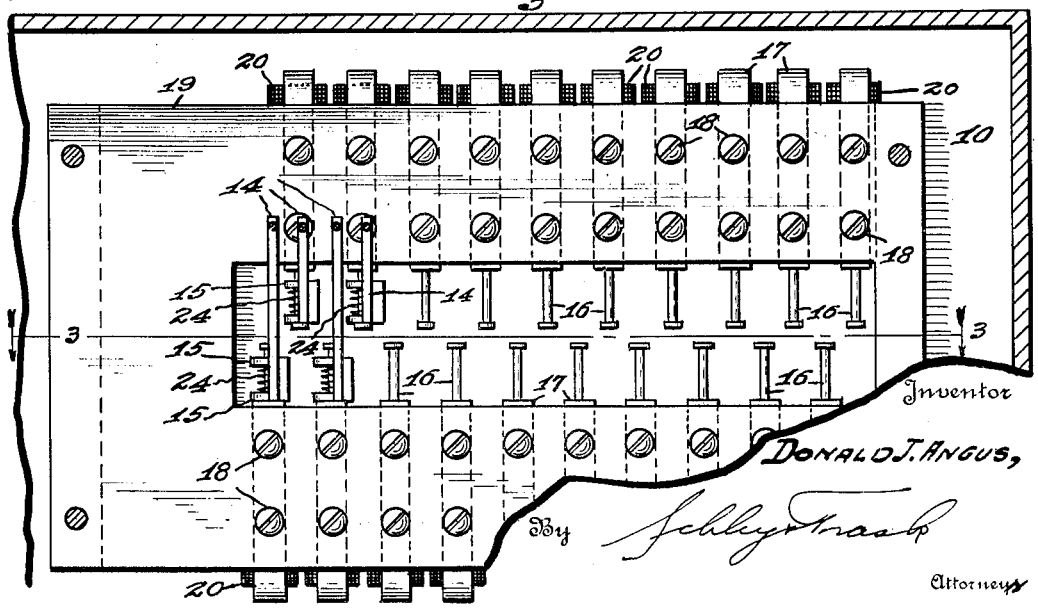
Inventor
Donald J. Angus,
By
Attorneys May 2, 1933.　　　D. J. ANGUS　　　1,907,096
RECORDING METER
Filed Oct. 13, 1928　　　3 Sheets-Sheet 3
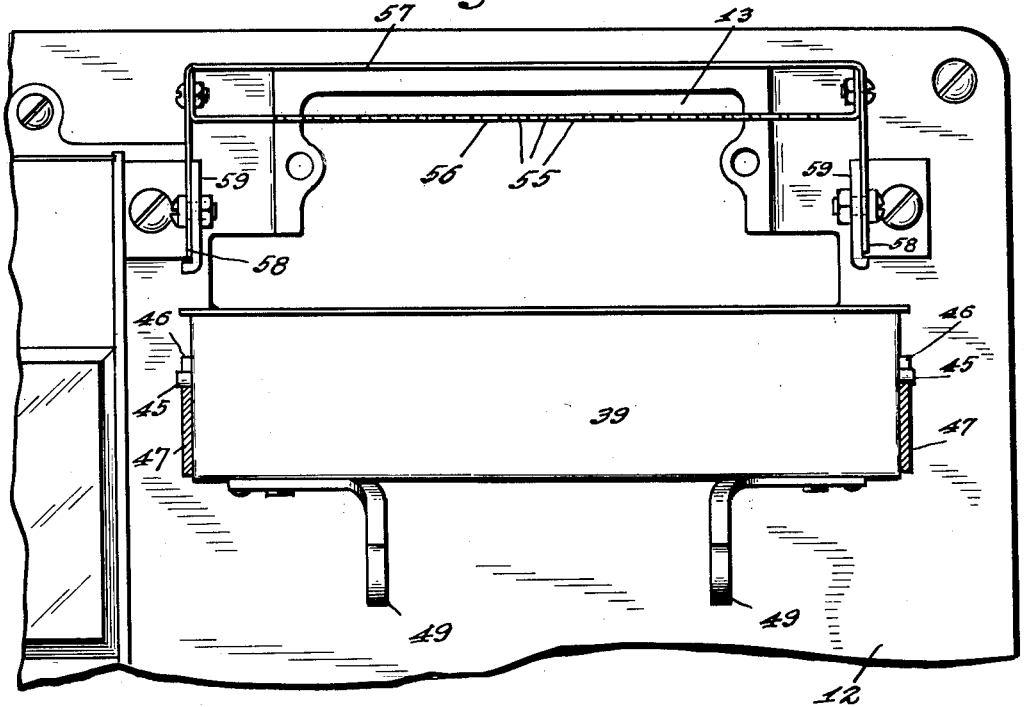
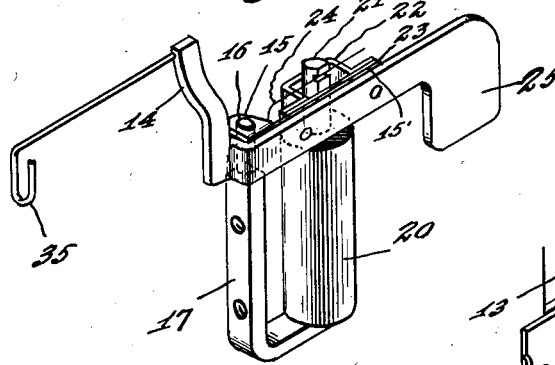
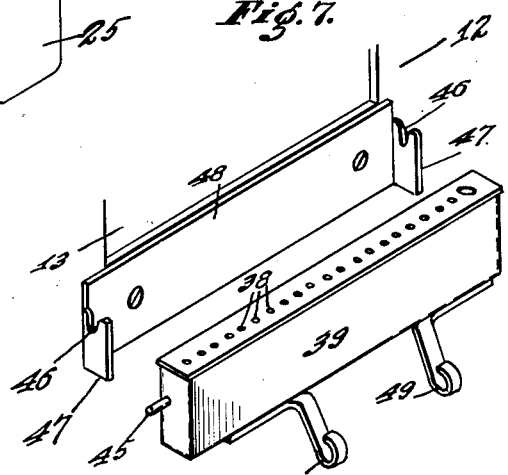
Inventor
DONALD J. ANGUS,
By
Attorneys Patented May 2, 1933

1,907,096

UNITED STATES PATENT OFFICE

DONALD J. ANGUS, OF INDIANAPOLIS, INDIANA

RECORDING METER

Application filed October 13, 1928. Serial No. 312,322.

My invention relates to recording meters, which operate to make a time record of the occurrence and duration of certain happenings; such, for instance, as the operation of the various motors in a shop, or the starting and stopping at various floors of different ones of a group of elevators in response to signals, etc.

It is the object of my invention to produce an improved inkwell and pen arrangement adapted to facilitate the construction of a recording meter which will have the advantages of accuracy in action, simplicity and inexpensiveness in manufacture, ease and certainty of assembly and disassembly, difficulty if not impossibility of improper assembly, ruggedness, and compactness. The uses for such an inkwell and pen arrangement are numerous, and it is advantageous in recording devices other than the one herein described as illustrative.

The constructional features of such improved inkwell and pen arrangement and of the meter in general, by which such advantages as the foregoing are obtained, will appear from the description, drawings, and claims.

Figure 1:
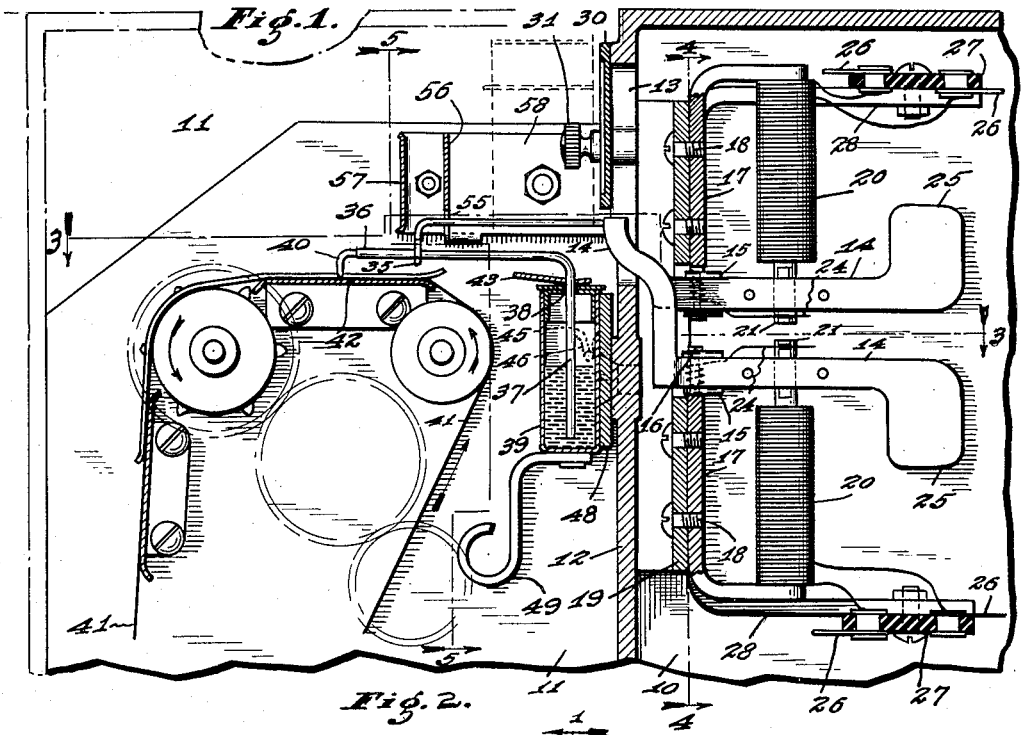
Figure 2:
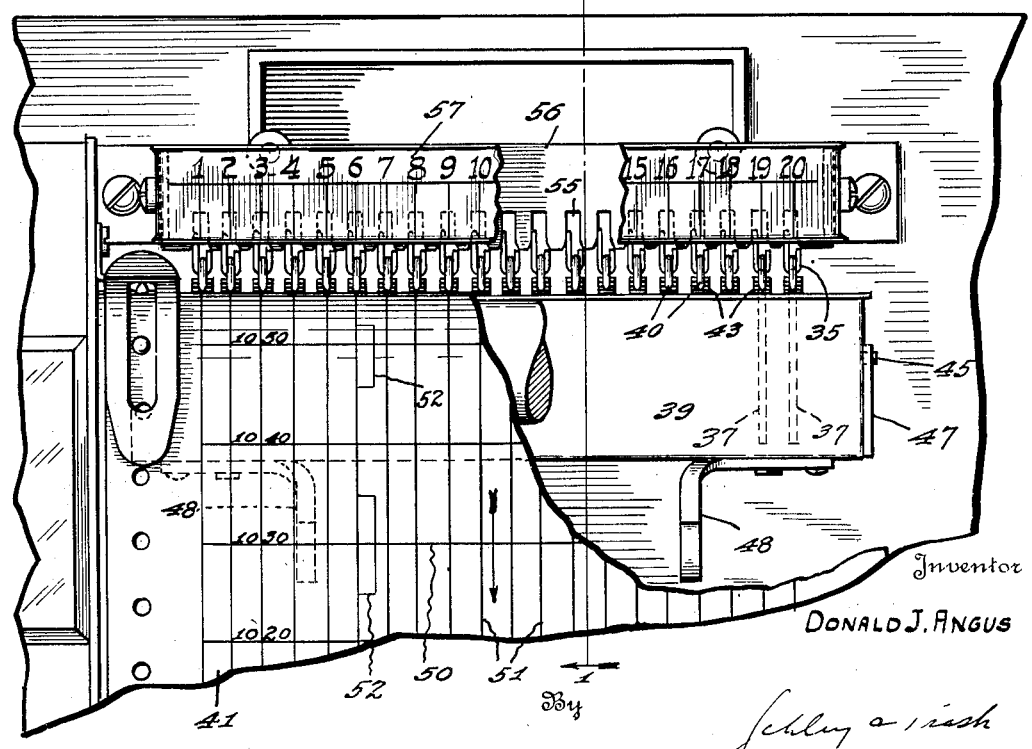

In such drawings, Fig. 1 is a fragmental section on the line 1—1 of Fig. 2, of the upper part of a recording meter embodying my invention as viewed from the side; Fig. 2 is a fragmental front elevation of the recording meter shown in Fig. 1, with certain parts broken away; Fig. 3 is a fragmental horizontal section substantially on the line 3—3 of Fig. 1; and Fig. 4 is a fragmental vertical section, viewed from the front, substantially on the line 4—4 of Figs. 1 and 3; Fig. 5 is a fragmental vertical section on the line 5—5 of Fig. 1, showing the comb-plate and number plate tilted up and the pens all removed; Fig. 6 is a perspective view of one of the electro-magnetic pen-operating devices; and Fig. 7 is a perspective view showing the inkwell and its support, with the inkwell separated from the support.

The recording meter has a rear compartment 10 in which the electro-magnetic actuating mechanism is mounted, and a front compartment 11 in which the recording mechanism is mounted. These two compartments are separated by a vertical partition 12, which is provided with an opening 13 through which the pen-operating elements 14 project.

There may be two banks, upper and lower, of these pen-operating elements 14. As shown, there are ten in each bank, or twenty in all; and the instrument may have any number of these in use, from one to twenty, in a recording meter of the size shown. The pen-operating elements 14 of the upper bank alternate with those of the lower bank, as is perhaps most clear from Fig. 4.

Each pen-operating element is provided with a pair of carrying ears 15, by which it is pivoted on pins 16; the pins 16 projecting downward for the upper bank and upward for the lower bank, and the pins of the two banks being staggered. Each pin 16 forms part of a magnet-carrying frame 17, which has a vertical part by which it is fastened by screws 18 to a main carrying plate 19, and a horizontal part to which one end of an electro-magnet 20 is carried for actuating the associated pen-operating element.

The magnets 20 are arranged in upper and lower banks, in staggered relation, corresponding to the arrangement of the pins 16; the magnets 20 of the upper and lower banks being supported at their upper and lower ends respectively from overlying and underlying horizontal parts respectively of the associated magnet-carrying frames 17. The cores 21 of the electro-magnets 20 project downward from the magnets of the upper bank and upward from the magnets of the lower bank past the associated pen-operating elements 14.

Each pen-operating element 14 has a limited movement about its carrying pin 16 with respect to the associated core 21, transversely of such core. To this end, the core lies between the pen-operating element itself, which may be of either magnetic or non-magnetic material though I prefer non-magnetic material, and a yoke 22 of non-magnetic material, as is clear from Fig. 3. The face of the pen-operating element 14 next to the core 21 has a facing 23 of non-magnetic material, to prevent sticking. Behind this non-magnetic facing 23 is a layer of magnetic material, which may be either the pen-operating element itself if that is of magnetic material or the base 15' which provides the carrying ears 15. When any magnet is energized, it pulls the associated pen-operating element 14 toward it, or counter-clockwise about the pin 16 as viewed in Fig. 3; and when that magnet is de-energized, the pen-operating element 14 is moved away from the core as far as permitted by the yoke 22, by a light spring 24 coiled around the associated pin 16 and acting between the core 21 and the pen-operating element 14.

The rear end of each pen-operating element 14 is provided with a weight-blade 25, as is clear from Fig. 1; for increasing the moment of inertia and thus preventing chattering.

The terminals of the electro magnets 20 are connected to suitable connection clips 26, mounted on insulating plates 27 carried by arms 28 in turn mounted on the main carrying plate 19.

The rear portions of the pen-operating elements of the upper and lower banks lie in different horizontal planes; but in front of the carrying pins 16 these pen-operating elements project through the hole 13 into the front compartment 11, in which all of the pen-actuating elements lie in the same horizontal plane. The upper part of the opening 13 is closed by a plate 30, removably held in place by thumb screws 31. The removal of the plate 30 gives more complete access to the elements in the rear compartment 10.

The front ends of the pen-operating elements 14 are turned downward, and provided with upwardly open hooks 35. These hooks embrace the horizontal portions 36 of the recording pens, but normally do not support such horizontal portions.

That is, such horizontal portions do not normally rest on the bottoms of the hooks 35, and so in action are free to drop downward slightly by gravity so far as those hooks are concerned.

The pens are primarily tubes bent at right-angles to provide the horizontal portions 36 already referred to and vertical portions 37. The vertical pen-portions 37 project downward through holes 38 in the top of an inkwell 39, and reach nearly to the bottom of such inkwell, as is clear from Fig. 1. Thus the vertical pen-portions serve to carry up the ink by capillary action; and in addition they serve as vertical pivot members about which the pens may swing horizontally under the action of the pen-operating elements 14. At the front ends of the horizontal pen-portions 36 are downturned tubular pen-points 40, which bear upon a moving record sheet 41 as the latter travels forward over a supporting plate 42. The record sheet 41 may be driven in any usual convenient manner, forming no part of my present invention. Just above the inkwell top, the vertical pen-portions 37 have fixed thereto forwardly projecting weight-bars 43, which serve the double purpose of limiting the downward movement of the pen-portions in the inkwell and of producing downward pressure on the pen-point 40 to make a firm line.

The inkwell is in the form of a rather long and narrow trough, lying in front of the partition 12. It is removably mounted; for which purpose it has supporting pins 45 at its two ends for resting in upwardly open notches 46 provided in forwardly turned ends 47 of supporting plates 48 suitably attached to the partition 12. To the bottom of the inkwell 39 are attached a pair of fingers 49, which project downward and are provided with loop ends which provide a ready grip of the thumb and forefinger of the operator when he wishes to lift out the inkwell or replace it.

The record sheet 41 is provided with transverse lines 50 representing time intervals, as of ten minutes, or one minute, or any other period desired; and has longitudinal lines 51 which correspond in number to the number of pens and correspond in transverse position with the normal positions of the respective pen-points 40.

So long as the magnet associated with any pen is unenergized, that pen travels along its associated line 51; but when the associated magnet 20 is energized to draw this armature to the left (Fig. 3) that pen is moved to the right to draw a line 52 which is displaced slightly to the right of the normal line corresponding to that pen. This is clear from Figs. 2 and 3. When the magnet is de-energized, the associated spring 24 returns the pen into position on its associated line 51. Thus the offset portions of the lines drawn by the respective pens tell a complete story of the starting, stopping, and continuance in operation of the device to whose action the associated magnet 20 is responsive; such as an electric motor for driving some particular piece of machinery.

The transverse movements of the pen-operating elements 14, and so of the pen, are limited by downwardly open notches 55 provided in a comb-plate 56. To this end, the pen-operating elements 14 near their forward ends are located in the notches 55. The left-hand edges of these notches 55 as viewed in Fig. 2 are so located that when the pen-operating elements 14 lie against those edges the associated pen points 40 travel on the respective lines 51, which is when the corresponding magnets 40 are respectively de-energized. When such magnets are respectively energized, they move the forward parts of the pen-operating elements 14 against the right-hand sides of the notches 55, as viewed in Fig. 2, to make the offset portions of the record lines 52.

The comb plate 56 is mounted behind a line-numbering plate 57, which has numbers to indicate the various lines 51. A key may be provided with the instrument to show what machines correspond to the various numbered lines.

The comb-plate 56 and the line-numbering plate 57 are carried by hinged arms 58, which may be back-turned extensions of the ends of the line-numbering plate 57. These arms 58 are hinged to brackets 59, mounted substantially over opposite ends of the inkwell 39. Thus the comb plate 56 and line-numbering plate 57 may be turned from its down or pen-positioning location indicated in full lines in Figs. 1 and 3 to the inoperative position shown in dotted lines in Fig. 1. This gives access to the inkwell and to the various pens; and facilitates ready removal of the pens from the inkwell and from the respective pen-operating elements by the mere lifting of the pens out of the inkwell and out of the hooks 35, and ready return of the pens by the reverse operation.

The lower or free ends of the prongs of the comb-plate are shaped as cams or wedges, so that when the comb-plate is swung down to working position they engage the pen-operating elements 14 and force them to the right just far enough to position the pen-points 40 on the respective lines 51.

I claim as my invention:

1. In combination with an inkwell having a pivot hole in its top, a pen having a vertical portion extending through said pivot hole to serve both as a pivot and as an ink-carrier.

2. The combination of an inkwell having a pivot hole in its top, a pen having a vertical portion extending downward through said pivot hole to serve both as a pivot and as an ink-carrier, and an unbalanced weight attached to said pen and resting on the inkwell top to hold the lower end of the pen clear of the inkwell bottom and for forcing the pen toward marking position.

3. The combination of an inkwell having a pivot hole in its top, a pen having a vertical portion extending downward through said pivot hole to serve both as a pivot and as an ink-carrier, and an unbalanced weight attached to said pen for forcing the pen-point toward marking position.

In witness whereof, I have hereunto set my hand at Indianapolis, Indiana, this 1st day of October, A. D. one thousand nine hundred and twenty-eight.

DONALD J. ANGUS.